Patented June 22, 1937

2,084,736

UNITED STATES PATENT OFFICE 2,084,736

PROCESS FOR PRODUCING YEAST

Sebastian Lutz and Robert Roy Irvin, Bloomfield, N. J., assignors to National Grain Yeast Corporation, Belleville, N. J., a corporation of New Jersey No Drawing. Application July 1, 1933, Serial No. 678,718

5 Claims. (Cl. 195—94)

This invention relates to a process for the production of yeast, and in particular bakers' yeast, by propagating the yeast in a medium which contains the nutrients necessary for the growth of the micro-organism.

In the growing of bakers' yeast it is customary to prepare a mash or wort from grain extractives, molasses and/or other materials which contain yeast assimilable nutrients. It has also been the usual practice to admix different nutrient materials in varying amounts in order to produce a wort which would be most satisfactory for yeast growth.

In the customary commercial practice, the prepared wort is divided into two portions, one of which consists of the setting wort and the other of the feed wort. The initial or setting wort is placed in the fermenter, vat, or other apparatus in which the propagation is carried on, and inoculated with a quantity of seed yeast. Propagation of the micro-organism is thus commenced. During the growing period it has become the universal practice to aerate the mixture by passing a large quantity of air through the solution in the fermenter. As the process is continued, it becomes necessary to add additional nutrient material, and this is accomplished by the introduction of the feed wort into the fermenter. The feed wort may be introduced from time to time during the growing period (which is usually in the neighborhood of 8 to 18 hours) or it may be added continuously throughout the entire growing period. Under some conditions the feed wort is not introduced for several hours after the inoculation of the setting wort since the initial material is considered capable of supplying the growth requirements of the yeast during this period.

Because of the biological and chemical processes occurring within the fermenter there is a tendency for the temperature to rise to a degree which would be detrimental to the propagation of the yeast. To avoid this undesirable condition, it becomes necessary in practice to cool the solution in the fermenter through practically the entire propagating period. This is usually accomplished by the circulation of cooling water or other cooling liquid through pipes which are immersed in the mixture contained in the fermenter.

In the processes familiar to the prior art, the practice has been to initiate the growing process in a relatively large volume of diluted wort, and during the propagating period to supply the remainder of the nutrients necessary for yeast growth by introducing into the fermenter a relatively concentrated feed wort containing sugar and other food materials suitable to satisfy the growth requirements of the micro-organism. This method necessitates the aeration and cooling of a relatively large volume of liquid throughout nearly the entire period of propagation, since the volume of liquid present at the start of the process is relatively large and is not very materially different from that volume which is present at the end of the process. This means that, during the earlier stages of the process, the volume of air necessary for aeration and the quantity of cooling liquid which must be circulated for purposes of temperature control approach very nearly those quantities which must be supplied during the later stages of propagation. This undesirable result, which is a direct consequence of the usual high degree of dilution of the setting wort, places an added burden on the machinery for circulating the air and cooling liquid and greatly increases the expense involved in the production of yeast.

The power necessary to circulate the air and cooling medium, which is by no means a small item in the entire cost of yeast production, is directly dependent on the volume of liquid through which the air must be forced or which must be cooled by a forced circulation. Any solution of the problem which would reduce the volume of liquid present during any stage of the growing process would result in a saving in the cost of power incident to yeast propagation. Accordingly, one of the objects of our invention is to reduce the amount of power required by reducing the volume of liquid which must be handled during the earlier stages of the process.

In the process now in commercial operation, because of the large volume of solution present in the fermenting vessels, it is frequently necessary to use several fermenters during all stages of the process. This, of course, adds to the cost since it is naturally more expensive to force air through several fermenters than it is to aerate a single unit. The cost of temperature control is also similarly increased by the necessity of handling the propagating solution in several fermenters during the entire procedure. Of course, any process which would make the use of several fermenters during the entire process unnecessary, or one in which the process could be started with a single fermenter and the other units brought into service as the volume to be treated increased, would result in marked economies in the cost of operation. Accordingly, another of the objects of our invention is to eliminate the necessity of using the maximum number of fermenters during all stages of propagation.

Although variations in the old and well known method of procedure which has been discussed above have been proposed from time to time, no change has been suggested which would obviate or reduce the large expense incurred in the handling of relatively large volumes of the diluted solution, at least without impairing considerably the efficiency of the process. In briefly discussing these variations, we may first direct attention to the patent to Hayduck No. 1,449,105, which is typical of the prior art processes which initiate propagation in a dilute wort and add thereto during the growing period a feed wort of relatively higher concentration. Such processes are, of course, open to the objections previously discussed.

In the patent to Corby No. 1,673,735, a modification of the general process is presented which utilizes, in common with the general commercial practice, a dilute wort for the initiation of growth. This patent suggests the periodic withdrawal of a portion of the contents of the fermenter at stated intervals throughout the growing period. The portion which has been withdrawn from the fermenter, which may have been withdrawn at the end of 4, 6, or 8 hours, is separately treated in the usual manner for the recovery of yeast. This means that each portion withdrawn before the end of the run is allowed to mature in a separate vat and is then treated in a filter press for the extraction of the desired micro-organism. After each withdrawal the balance of the solution remaining within the fermenter is diluted to approximately the same concentration as the material initially in the vessel, and propagation is continued.

While the Corby process permits the use of fermenters of less total capacity than had previously been customary, it is open to many serious objections. First it involves additional manipulative steps which, of course, means that the manufacturer incurs additional expense in growing his product. Since each portion withdrawn requires separate maturing and may require separate treatment in a filter press, larger demands are made for storage space than was characteristic of the earlier processes. Then again since portions of the total quantity of the growing organism are removed prior to the period of complete growth, there is always the possibility that the withdrawn portion may contain cells which have been insufficiently propagated. This means that the process is necessarily an uncertain one, and moreover, it only partially solved the difficulties which were present in the older commercial methods.

More recently the process of propagation disclosed in the patent to Sak No. 1,884,272 has been advanced as an improvement over the periodic withdrawal process of Corby. In the method of this patent, propagation is commenced in a relatively dilute wort (1.8° Balling) and a relatively dilute feed wort (1.5° Balling) is added to supply the nutrient. A short time after inoculation of the setting wort, a certain quantity of the solution in the fermenter is continuously withdrawn at a definite rate per hour, which may be fixed or variable. To take the place of the solution withdrawn, an equal volume of nutrient solution is continuously added together with additional seed yeast. The yeast containing wort withdrawn is allowed to stand for the purpose of maturing the yeast, and it is then treated in a filter press.

While this process resulted in some economies, it is open to all of the objections which may be advanced against the process of Corby. It involves additional manipulative steps with consequent increased expense. Since the solution is removed before the end of the run, yeast which is insufficiently grown may be obtained, and this may result in a product unsatisfactory for baking purposes. Moreover, when wort is removed, it normally still contains certain quantities of nutrient matter, and since this is withdrawn from the fermenter, it is ordinarily wasted. While the cost of aeration may have been reduced by the Sak process, the expenses incident to its employment and the uncertain character of the process have prevented it from coming into general use.

With all of these defects in the process known to manufacturers of yeast in commercial amounts in mind, it has been one of the objects of our invention to reduce the cost incident to aeration and cooling of the large volumes of propagating solution involved without affecting ease of operation or the satisfactory character of the desired commercial product. It was one of the objects of the invention herein disclosed to eliminate entirely the necessity for withdrawing any portion of the wort from the fermenter for maturing and filtering before the completion of the entire growing process, at the same time reducing the total quantity of liquid which must be aerated and cooled to the absolute minimum during all stages of the process.

With these objects in mind, other and ancillary objects will be apparent as the novel steps forming the subject matter of our improved process are described in detail.

In this process only a small volume of setting wort is used and as a result of this feature there is a considerable reduction in the quantities of air and cooling liquid required during the early stages of the process. This wort may be conveniently obtained by preparing, as the first step, a more concentrated nutrient wort in the manner well known to the prior art. The concentrated wort usually contains 10 to 40% of sugar and other nutrients. A portion of this concentrated wort is diluted to a density of 3° to 4° Balling and introduced into the fermenter as setting wort.

This relatively small quantity of setting wort, considerably less in amount than the quantity which it is customary to introduce into a fermenter of a given size in the present practice, is adjusted to a suitable temperature and inoculated with a definite amount of seed yeast. Propagation of the yeast cells commences and during this growing process the material in the fermenter is aerated and cooled in the customary manner. However, as the volume is relatively small, the cost of such aeration and cooling is low.

During the growing period a dilute feed wort of the same type and of substantially the same density as that constituting the setting wort is fed to the growing micro-organism. The temperature of the feed wort may be selected so that it tends to maintain the temperature within the fermenter within a certain desired range. The rate of feed is adjusted, of course, to suit the nutrient requirements of the growing yeast. In practice this means, since both setting wort and feed wort contain substantially the same concentration of sugar per unit volume, that the feed wort is added at such a rate that the concentration of yeast cells present in a unit volume of the solution remains substantially constant. The maintenance of the yeast concentration approximately constant during the entire growing period is a feature of this process.

Instead of introducing the feed wort as a relatively dilute solution (3° to 4° Balling), this wort may be stored in tanks in more concentrated form and mixed with water to the required diluted consistency just prior to introduction into the fermenter. Or the concentrated wort and water may be introduced into the vessel in separate streams, thus producing a feed wort of the desired concentration within the fermenter itself. In either case, the necessity for storage tanks of large capacity is avoided, and this constitutes another feature which makes the process herein disclosed such a practical and economical one.

One of the features of our process is the use of a much higher ratio between the volume of the feed liquids and the volume of the initial or setting wort than has ever been employed before in the commercial manufacture of yeast. Generally, in the methods of the prior art the volume of the wort employed for feeding rarely even equalled the volume of the setting wort. In the usual process in commercial use today, the volume of feed wort is approximately 25% of that of the total volume added to the fermenter, and the volume of setting wort is about 75% of the total volume. Although some variation in these percentages may occur, the feed wort would in all cases be less than 50% of the total volume added to the fermenter in the well known method described in the patent to Hayduck No. 1,449,105. While occasionally the quantity of feed wort may have very slightly exceeded the volume of the setting wort, this was very unusual and occurred only in isolated instances. We contemplate the use of such quantities of feed and setting liquids that the ratio of the volume of feed liquids to the volume of setting wort will vary from two to ten. This means that the volume of the feed liquids is from two to ten times the volume of the initial wort with which the fermenter is set.

The gravity of the setting wort employed in our process may be the same as that of the feed liquids. In this case it might be desirable, but not absolutely necessary, to delay the commencement of feeding until the end of one-half hour or an hour. For the highest yields it would probably be desirable to dilute the setting wort with a small amount of water and initiate feeding at once. These variations in the process can very well be suited to convenience of operation and can be made to conform with the practices or conditions in the plant. They do not affect our general process to any appreciable extent and are mentioned merely for completeness.

Yeast growth may be initiated in one fermenter with a relatively large amount of seed yeast, and when this fermenter has become filled by the addition of diluted feed wort (or concentrated wort and water) a substantial portion of the yeast containing solution may be transferred to one or more fermenters. Propagation and aeration is continued in all of these fermenters including the first, and feed liquid is added thereto in accordance with the methods previously described. In this way a considerable economy in yeast production is obtained. During a part of the propagation period only one fermenter would be in use, and the maximum requirements for cooling liquid and compressed air would occur only after all the fermenters were started and were nearly filled as a result of the addition of feed wort.

As specific examples of this process, the following may be considered as illustrative. It is to be understood, of course, that while the details have been given rather fully in describing these processes, this has been done merely for completeness, and variations may be made in a greater or less degree from the specific steps employed without constituting a departure from our process.

*Example I*

A wort composed of molasses and grain extractives was prepared having a density of 11.5° Balling. To 59.4 liters of this wort, 59.8 grams of aqua ammonia and 105.3 grams of ammonium sulphate were added. 1 liter of this prepared wort was introduced into the fermenter and constituted the setting wort.

The remainder of the 59.4 liters was diluted to a volume of 189.6 liters and constituted the feed wort. The gravity of this solution was very close to 4° Balling.

To the fermenter which contained 1 liter of the 11.5° Balling setting wort, 10 grams of ammonium sulphate, 30 grams of mono ammonium phosphate, 1,000 grams of seed yeast, and enough water to increase the volume to about 30 liters were added. The gravity of the material in the fermenter was then 1.65° Balling. Propagation then started and aeration of the solution was commenced. The introduction of the 4° Balling feed wort into the fermenter was also begun.

After 5½ hours, 61 liters of the feed wort had been fed to the propagating yeast. Since the fermenter was rapidly becoming filled, it was necessary to divide the contents thereof between two fermenters. After this had been accomplished, feeding and propagation with aeration were resumed in both fermenters. Feeding was continued for a total period of 13 hours which includes the total period from the time the first fermenter had been set with seed yeast until all of the feed wort had been fed to the growing cells. During the period of growth, certain additional salts were added to the fermenters in portions from time to time. In this way a total of 109 grams of ammonium sulphate, 119.6 grams of di-ammonium phosphate and 86.0 grams of mono-ammonium phosphate were added exclusive of the salts which were supplied with the feed wort. During the entire process a temperature of 28° C. was maintained in the fermenters.

At the end of the 13th hour the yeast was matured with reduced aeration for 1½ hours. At the end of this process, each fermenter contained about 118 liters of yeast-containing solution, or a total of about 236 liters for the two fermenters. The matured yeast was then separated from the beer, washed, and pressed. The yield was very high and the quality of the yeast, as determined by baking tests, was excellent.

*Example II*

In this process the wort included a mixture of molasses and mineral salts. In all 59.4 liters of this wort was prepared by the addition of the salts to a mash of 11.5° Balling prepared from clarified beet molasses. In the preparation of this salt-containing wort, 471.9 grams of ammonium bicarbonate was added to the molasses.

1 liter of this prepared wort was introduced into the fermenter together with 75 grams of mono-ammonium phosphate, 1300 grams of seed yeast, and sufficient water to bring the total volume in the fermenter to about 30 liters. The gravity of the material in the fermenter was then 1.85° Balling. The remainder of the 11.5° Balling wort was diluted with water to about 4° Balling and utilized as feed wort.

Introduction of the feed wort was begun at once. Aeration was also started and propagation of the yeast continued. A temperature of 28° C. was maintained throughout the entire process.

After 67 liters of the feed wort had been introduced into the fermenter, which occurred about 5½ hours after the beginning of propagation, the yeast containing solution was divided equally between two fermenters. Feeding and propagation were continued in these two fermenters as described in Example I. At 11½ hours after the beginning of the growing process in the first fermenter all of the feed wort had been used up and aeration was reduced. During the growing period additional salts had been added to the fermenters, exclusive of the salts contained in the feed wort. In all 200 grams of mono-ammonium phosphate and 220 grams of ammonium sulphate were added from time to time during the growing period, all salts being added prior to the maturing of the yeast.

The yeast was then matured for 1½ hours under reduced aeration. At the end of this step each fermenter contained about 118 liters of yeast containing solution or a total of 236 liters for the two fermenters. The matured yeast was then separated from the beer and washed. The quality of the yeast, determined by baking tests, was excellent and in amount the yield was satisfactory.

*Example III*

A wort was prepared from beet molasses and grain extractives which possessed a density of 3.35° Balling. 234.7 liters of this wort was separated and used in the process. To this amount of the prepared wort, 105.3 grams of ammonium sulphate, and 59.6 grams of aqua ammonia were added. Ammonium lactate was present in this material as a result of the neutralization by the ammonia of lactic acid produced by bacteria present during the souring of the grain-molasses mash.

Approximately 27 liters of this prepared wort was placed in a fermenter together with 30 grams of mono-ammonium phosphate and 1300 grams of seed yeast. Aeration was then started and the temperature was maintained at 28° C.

The remainder of the 234.7 liters of wort was reserved for feeding, which was commenced after one hour. In five and one-half hours the first fermenter became nearly filled and its contents were accordingly divided between the first and a second fermenter. Feeding and propagation were then continued in both fermenters. After a total period of eleven and one-half hours from the beginning of propagation in the first fermenter the feed was exhausted. Aeration was then reduced and the yeast was matured for one and one-half hours.

During the propagation period a total of 190.5 grams of mono-ammonium phosphate and 50 grams of ammonium sulphate were added to the fermenters. These salts were in addition to the chemicals added to the original 3.35° Balling wort.

At the conclusion of the process the total yeast-containing wort present in the two fermenters amounted to about 215 liters. The reduced volume of the wort, as compared with the original volume of 234.7 liters, was a result of the evaporation caused by aeration.

The yeast was separated from the beer and washed. The yield was satisfactory and the quality of the yeast, as measured by its baking abilities, was excelent.

It will be apparent that by following the process disclosed herein, a considerable saving can be made in the cost of aeration. For example, if only one fermenter is used throughout the entire process, at the beginning of the propagation the fermenter will contain only 10 to 35% of the total wort. This is a very small amount as compared with the initial quantity customary in the present practice. At first the pressure head of the liquid will be relatively small and less power will be needed to force air through this yeast-containing liquid. If several fermenters are used, however, propagation can be started in one and at first only sufficient compressed air for this single fermenter will be required. Later when the fermenting wort is divided between several fermenters, it is apparent that there will be an immediate reduction in the pressure of the liquid because of the smaller head of liquid in each of these fermenters. This reduced pressure will exist through a large portion of the propagating process and maximum power for aeration will be required only toward the end of the growth period.

In the examples which have been given to illustrate the process, it is clearly apparent that only a single ferementer was in use during nearly half the total period of the strong aeration required for propagation. As an illustration, in the second example, one fermenter served for about 42% of this period. Marked savings in power are the result of the use of the process since in the methods customarily employed in commercial manufacture relatively large volumes of liquid are handled from the very start of the process. This means that air must be forced through several fermenters with relatively large heads of yeast-containing liquid almost from the very commencement of propagation.

Another important advantage is apparent when the saving in cooling liquid required is considered. The amount of cooling water necessary is much less than in the usual practice where the fermenters are all nearly filled with diluted wort and cooled by a cooling liquid run through coils positioned in the wort. In the process herein disclosed, part of the cooling may be effected by the rapid addition of diluted and cooled feed wort, or by a separate stream of cold water which is directly led to the fermenter. In fact in certain cases there may be no necessity of circulating cooling liquid at all as the required cooling can be accomplished by regulation of the temperature of the added feed wort or feed wort and water. In any case since the volumes of liquid involved are much smaller, the amount of cooling liquid which must be circulated through cooling pipes is considerably less than the quantities considered necessary in factories operating under the customary methods.

A practical and economical way to carry out our process in commercial use is to feed into the fermenter a relatively small volume of wort of rather high concentration, 10–40° Balling or preferably 20–40° Balling, together with a large volume of cold water. If desired, the concentrated feed wort could be kept warm to prevent the growth of bacteria, wild yeast, and other harmful organisms. Even if the wort were warmed, it would not have any appreciable tendency to raise the temperature of the fermenter, because it would be added with a much larger volume of cold water. The final result would be a tendency to lower the fermenter temperature as a result of the much greater volume of cold water added with the feed wort.

Another important advantage of our process is that toxic by-products which may be harmful to the yeast are rendered innocuous by the feeding methods employed. These toxic by-products are diluted by the rapid addition of relatively diluted liquid to the fermenter, and in this manner are less injurious to the yeast. At the commencement of fermentation, these toxic by-products are not present and there is no necessity of reducing their deleterious action until they become concentrated enough to become harmful. This means that even though relatively small amounts of liquid are present during the earliest stages, there are not enough toxic substances at that time to harm the yeast. As growing continues, and these injurious elements increase, dilution by means of the feed wort rapidly reduces the concentration of these by-products.

Another important advantage is that our process allows greater convenience in plant operation. If there are a number of fermenters in the plant the propagation of yeast need be started in only a relatively small fraction of these fermenters while in the meantime the remaining units may be cleaned or repaired. As needed, these additional units are brought into use. In this manner a greater total idle time is obtained when all units of the yeast factory are considered.

An additional important advantage is the result of the maintenance of yeast at a substantially uniform concentration throughout the entire process. It is clearly apparent that where a relatively high and uniform concentration of yeast is maintained at all times, it is possible to utilize the nutrients more efficiently. In this manner a minimum of nutrients for the quantity of yeast produced is required.

Having thus described our invention, what we claim as new and desire to secure by Letters Patent of the United States is:

1. In a process of yeast propagation in which propagation is started in an initial or setting yeast wort, a feed wort containing yeast nutrient materials is added thereto and propagation continued therein, thereby forming a propagating mixture, the step of adding separately a stream of water and a stream of concentrated feed wort heated to a temperature high enough at least to retard any change therein so that there is produced within the fermenter a large volume of a dilute nutrient feed wort, the temperature of the water stream being regulated for the purpose of cooling the propagating mixture and substantially entirely controlling the temperature thereof so as to maintain it at a temperature suitable for yeast propagation.

2. In a process of yeast propagation in which propagation is started in an initial or setting wort and feed wort containing a yeast nutrient material is gradually added thereto while propagation is continued therein, thereby forming a propagating mixture, the steps of maintaining said feed wort in concentrated form at a temperature high enough at least to retard the growth of harmful organisms therein, and adding said feed wort to the propagating yeast simultaneously with a quantity of water greater than the quantity of the feed wort and having its temperature regulated so as to cool the hot feed wort and the propagating mixture and substantially entirely control the temperature thereof so as to maintain the propagating mixture at a temperature suitable for yeast propagation.

3. In a batch process for the propagation of yeast, in the presence of a liquid, from a given quantity of yeast nutrients in which the propagation is commenced in a setting wort in one fermenter and the yeast nutrients are gradually supplied to the growing plant in a feed wort substantially continuously throughout the greater part of the period of propagation, regulating the volume and composition of said feed wort relative to said setting wort so that from five-sixths to ten-elevenths of the said quantity of yeast nutrients and of the liquid are supplied by said feed wort, starting the propagation in the setting wort in a single fermenter with aeration therein, adding feed wort to the propagating mass, dividing the propagating mass between a plurality of fermenters, and continuing propagation in such plurality of fermenters while gradually adding more feed wort, without withdrawing any substantial portion from the propagating mass.

4. In a process of propagating yeast in a yeast nutrient medium in which additional yeast nutrients are added in a yeast feed wort to a starting material suitable for yeast propagation, thereby forming a yeast propagating mixture, the step of substantially entirely controlling the temperature of the nutrient medium during propagation by adjusting the temperature of the feed wort so that the temperature in the propagating mixture is maintained within a range suitable for yeast propagation throughout the process.

5. In a batch process for the propagation of yeast from a given quantity of yeast nutrients, the steps of introducing into the fermenter as a setting wort from ⅙ to 1/11 of said yeast nutrient together with water, and adding the remaining nutrients gradually and substantially continuously throughout the great part of the period of propagation as feed wort together with water in an amount from five to ten times that present in the setting wort, without removing yeast nutrients from the propagating wort mass during the growing process, the feed wort being supplied at a rate sufficient simultaneously to furnish the nutrients required by the growing yeast and to maintain the concentration of yeast per unit volume of wort substantially a constant value.

SEBASTIAN LUTZ.
ROBERT ROY IRVIN.